United States Patent
Kim et al.

(10) Patent No.: US 10,608,725 B2
(45) Date of Patent: Mar. 31, 2020

(54) METHOD FOR REPORTING CHANNEL STATE AND APPARATUS THEREFOR

(71) Applicant: LG ELECTRONICS INC., Seoul (KR)

(72) Inventors: Kijun Kim, Seoul (KR); Jonghyun Park, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,471

(22) PCT Filed: Sep. 6, 2016

(86) PCT No.: PCT/KR2016/009960
§ 371 (c)(1),
(2) Date: Mar. 8, 2018

(87) PCT Pub. No.: WO2017/043834
PCT Pub. Date: Mar. 16, 2017

(65) Prior Publication Data
US 2018/0262251 A1    Sep. 13, 2018

Related U.S. Application Data

(60) Provisional application No. 62/216,339, filed on Sep. 9, 2015.

(51) Int. Cl.
*H04B 7/06* (2006.01)
*H04B 7/024* (2017.01)
(Continued)

(52) U.S. Cl.
CPC ........... *H04B 7/0626* (2013.01); *H04B 7/024* (2013.01); *H04B 7/0417* (2013.01);
(Continued)

(58) Field of Classification Search
CPC . H04W 72/0413; H04W 24/08; H04W 24/10; H04W 72/042; H04W 52/146;
(Continued)

(56) References Cited

U.S. PATENT DOCUMENTS

2012/0281567 A1  11/2012  Gao et al.
2013/0301448 A1  11/2013  Sayana et al.
(Continued)

FOREIGN PATENT DOCUMENTS

WO    WO 2012/112291 A1    8/2012

OTHER PUBLICATIONS

LG Electronics, "CSI process and CSI-RS configurations for supporting EBF/FD-MIMO," 3GPP TSG RAN WG1 Meeting #82, R1-154272, Beijing, China, Aug. 24-28, 2015, pp. 1-3.

*Primary Examiner* — Janice N Tieu
(74) *Attorney, Agent, or Firm* — Birch, Stewart, Kolasch & Birch, LLP

(57) ABSTRACT

The present invention relates to a wireless communication system and, specifically, provides a method for reporting a channel state and an apparatus therefor. A terminal of the present invention receives, from a base station, configuration information for a plurality of sets, each including at least one of a plurality of channel state information-reference signal (CSI-RS) resources configured for a channel state information (CSI) process. The terminal reports CSI measured on the basis of only at least one CSI-RS resource included in a first set which is one of the plurality of sets. Here, the first set may include only some CSI-RS resources of the plurality of CSI-RS resources configured for the CSI process.

11 Claims, 12 Drawing Sheets

(51) Int. Cl.
*H04L 5/00* (2006.01)
*H04B 7/0456* (2017.01)
*H04B 7/0417* (2017.01)

(52) U.S. Cl.
CPC .......... *H04B 7/0465* (2013.01); *H04L 5/005* (2013.01); *H04L 5/0057* (2013.01)

(58) Field of Classification Search
CPC . H04W 16/32; H04W 76/025; H04W 52/386; H04L 5/0035; H04L 5/0053; H04L 5/0073; H04L 5/14; H04L 5/0048; H04B 7/0626
See application file for complete search history.

(56) References Cited

U.S. PATENT DOCUMENTS

| | | | |
|---|---|---|---|
| 2015/0043499 A1 | 2/2015 | Yue et al. | |
| 2015/0124663 A1* | 5/2015 | Chen | H04L 5/0053 370/278 |
| 2015/0162966 A1* | 6/2015 | Kim | H04B 17/00 370/252 |
| 2015/0365937 A1* | 12/2015 | Etemad | H04W 4/90 370/329 |
| 2016/0134408 A1* | 5/2016 | Kim | H04B 7/0626 370/329 |
| 2016/0227519 A1* | 8/2016 | Nimbalker | H04L 5/0094 |
| 2017/0041880 A1* | 2/2017 | Ouchi | H04W 16/32 |
| 2017/0332268 A1* | 11/2017 | Yang | H04W 24/00 |

* cited by examiner

METHOD FOR REPORTING CHANNEL STATE AND APPARATUS THEREFOR

CROSS REFERENCE TO RELATED APPLICATIONS

This application is the National Phase of PCT International Application No. PCT/KR2016/009960, filed on Sep. 6, 2016, which claims priority under 35 U.S.C. 119(e) to U.S. Provisional Application No. 62/216,339, filed on Sep. 9, 2015, all of which are hereby expressly incorporated by reference into the present application.

TECHNICAL FIELD

The present invention relates to a wireless communication system, and more particularly, to a method for reporting a channel state and an apparatus therefor.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

The present invention suggests a method for reporting a channel state, and suggests a method for restricting selectable beams to report channel state information per specific time interval.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In one aspect of the present invention, a method for reporting a channel state of a UE (user equipment) in a wireless communication system comprises the steps of receiving configuration information on a plurality of sets, each of which includes one or more of a plurality of CSI-RS (channel state information-reference signal) resources configured for a CSI process; and reporting CSI measured based on one or more CSI-RS resources only included in a first set which is one of the plurality of sets.

In another aspect of the present invention, a method for receiving a channel state of a base station in a wireless communication system comprises the steps of transmitting, to a UE, configuration information on a plurality of sets, each of which includes one or more of a plurality of CSI-RS (channel state information-reference signal) resources configured for a CSI process; and receiving, from the UE, CSI measured based on one or more CSI-RS resources only included in a first set which is one of the plurality of sets.

In still another aspect of the present invention, a UE in a wireless communication system comprises a radio frequency (RF) unit; and a processor configured to control the RF unit, wherein the processor is configured to receive configuration information on a plurality of sets, each of which includes one or more of a plurality of CSI-RS resources configured for a CSI process, by controlling the RF unit and report CSI measured based on one or more CSI-RS configurations only included in a first set which is one of the plurality of sets.

In further still another aspect of the present invention, a base station in a wireless communication system comprises a radio frequency (RF) unit; and a processor configured to control the RF unit, wherein the processor is configured to transmit, to a UE, configuration information on a plurality of sets, each of which includes one or more of a plurality of CSI-RS resources configured for a CSI process, by controlling the RF unit and receive, from the UE, CSI measured based on one or more CSI-RS configurations only included in a first set which is one of the plurality of sets.

In each aspect of the present invention, a triggering signal indicating the first set of the plurality of sets may be received.

In each aspect of the present invention, a triggering signal for triggering CSI report may be received, wherein the plurality of sets correspond to CSI subframe sets, and the first set may be a CSI subframe set corresponding to a subframe at which the triggering signal is received.

In each aspect of the present invention, the configuration information may include information indicating one or more CSI-RS resources included per the plurality of sets.

In each aspect of the present invention, the configuration information may include bitmap information indicating CSI-RS resource allocated per each set, among the plurality of CSI-RS resources configured for the CSI process.

At this time, the bitmap information may be provided for a set that includes some of the plurality of CSI-RS resources configured for the CSI process.

At this time, the plurality of sets may be CSI subframe sets or CSI resources sets.

In each aspect of the present invention, the plurality of sets may include one or more CSI-IM (interference measurement) resources.

In each aspect of the present invention, codebook information available for CSI measurement per the plurality of CSI-RS resources may be configured individually by a base station.

At this time, the codebook information available for CSI measurement per the plurality of CSI-RS resources may be designated equally by the base station.

At this time, the codebook information available for CSI measurement per the plurality of CSI-RS resources may be designated independently by the base station.

At this time, a plurality of codebook restriction information may be received, and information indicating which one of the plurality of codebook restriction information is applied per the plurality of CSI-RS resources may be received.

The above technical solutions are merely some parts of the embodiments of the present invention and various embodiments into which the technical features of the present invention are incorporated can be derived and understood by persons skilled in the art from the following detailed description of the present invention.

Advantageous Effects

The base station restricts use of beams used for channel state report at a specific time interval for the purpose of eICIC (Enhanced Inter-Cell Interference Coordination) or eIMTA (enhanced interference management and traffic adaptation), and thus the UE may perform CSI measurement and report for the other beams except the beams restricted by the base station.

Therefore, in the present invention, a channel state may be reported without a beam (representatively, beam transmitted in a direction of a zenith angle of 90°) of a specific direction to attenuate interference applied to a neighboring cell at a specific time interval.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Figure 1:
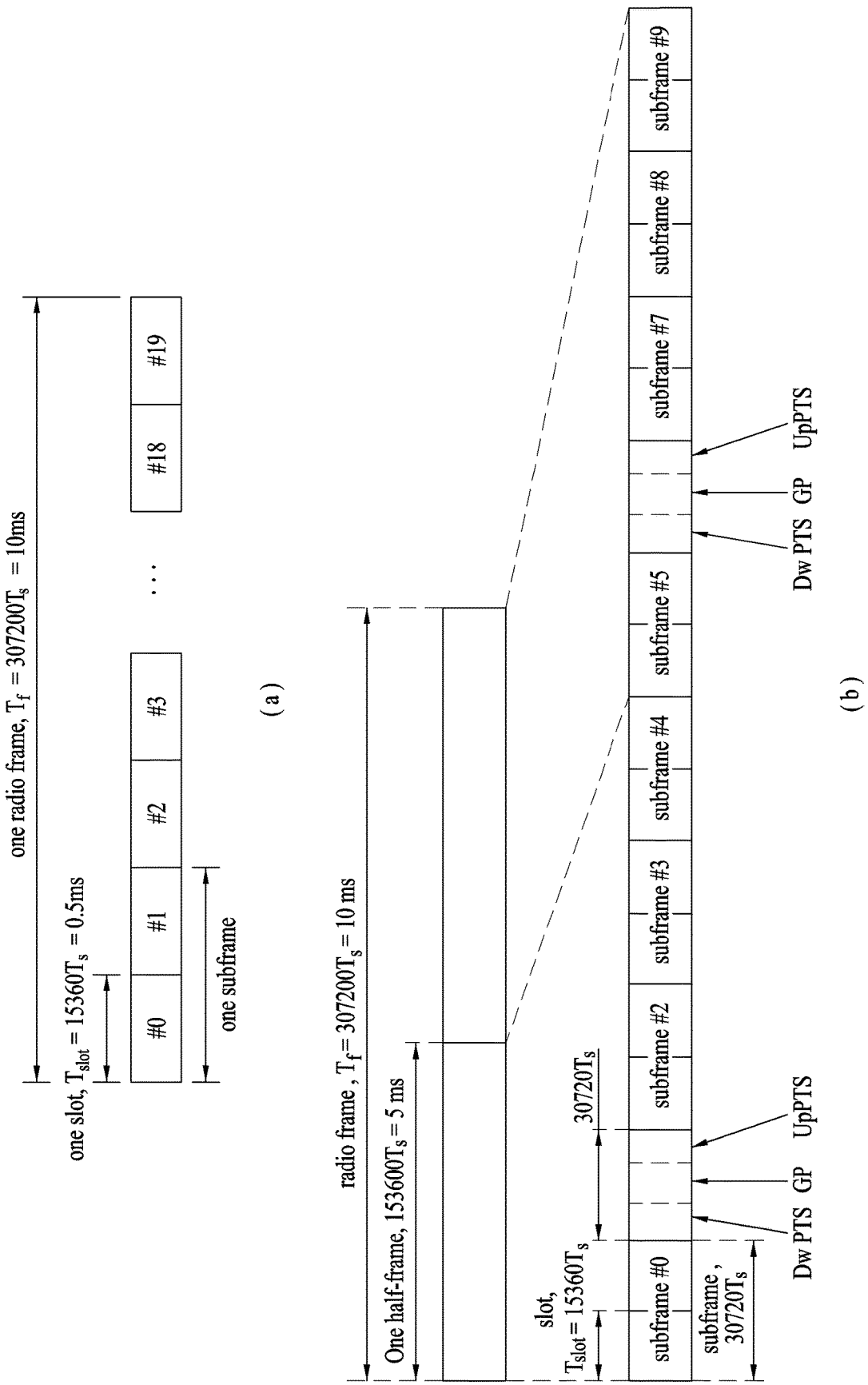
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configu-ration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
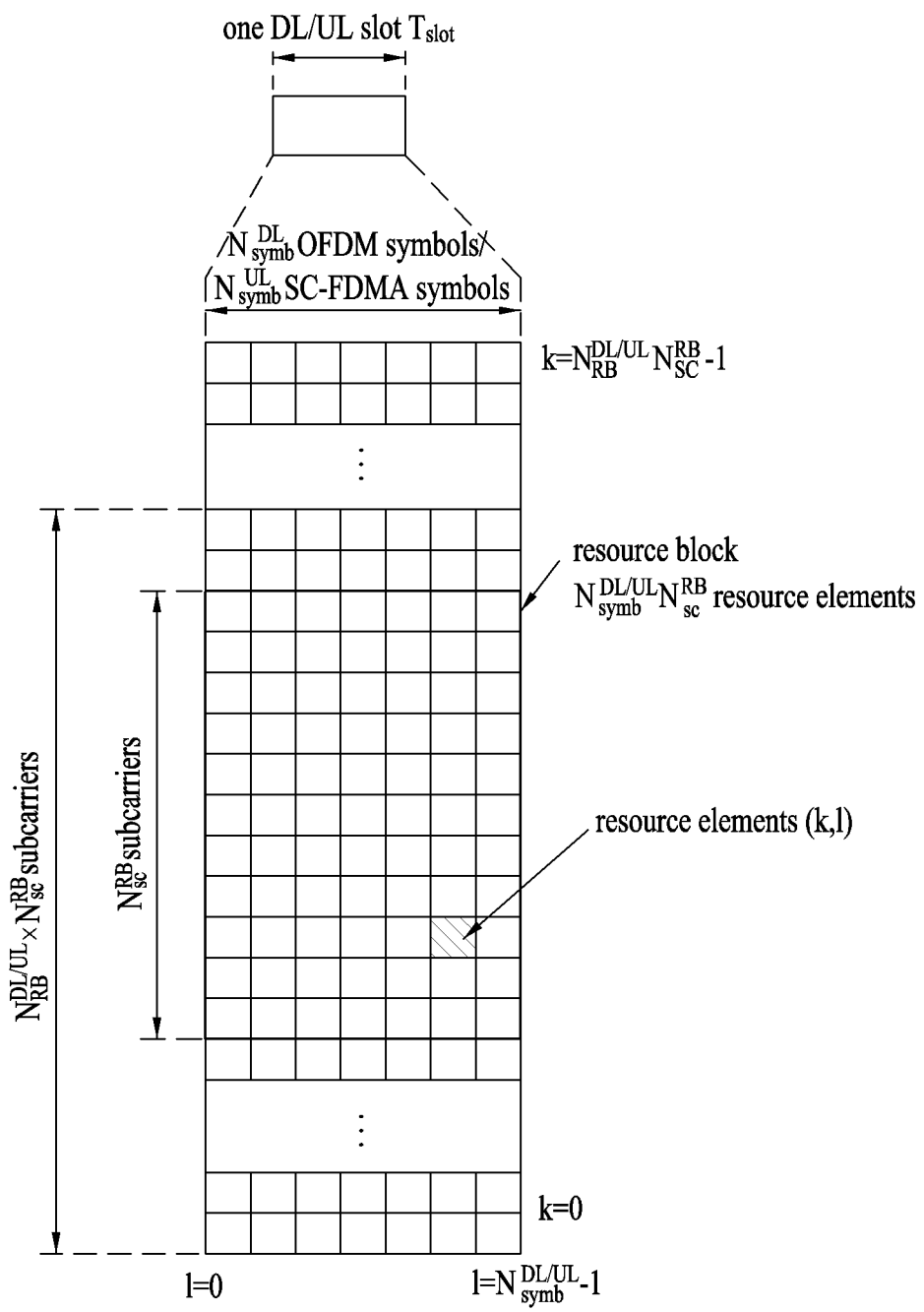
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same FRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
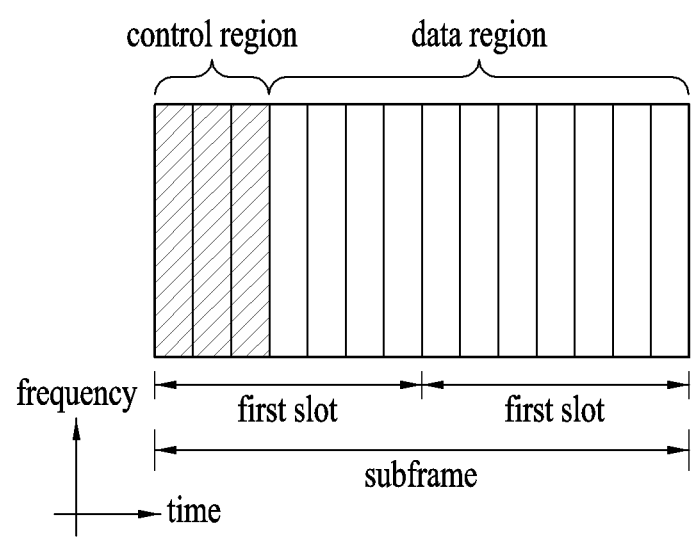
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
|---|---|---|---|
| Type | Aggregation Level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
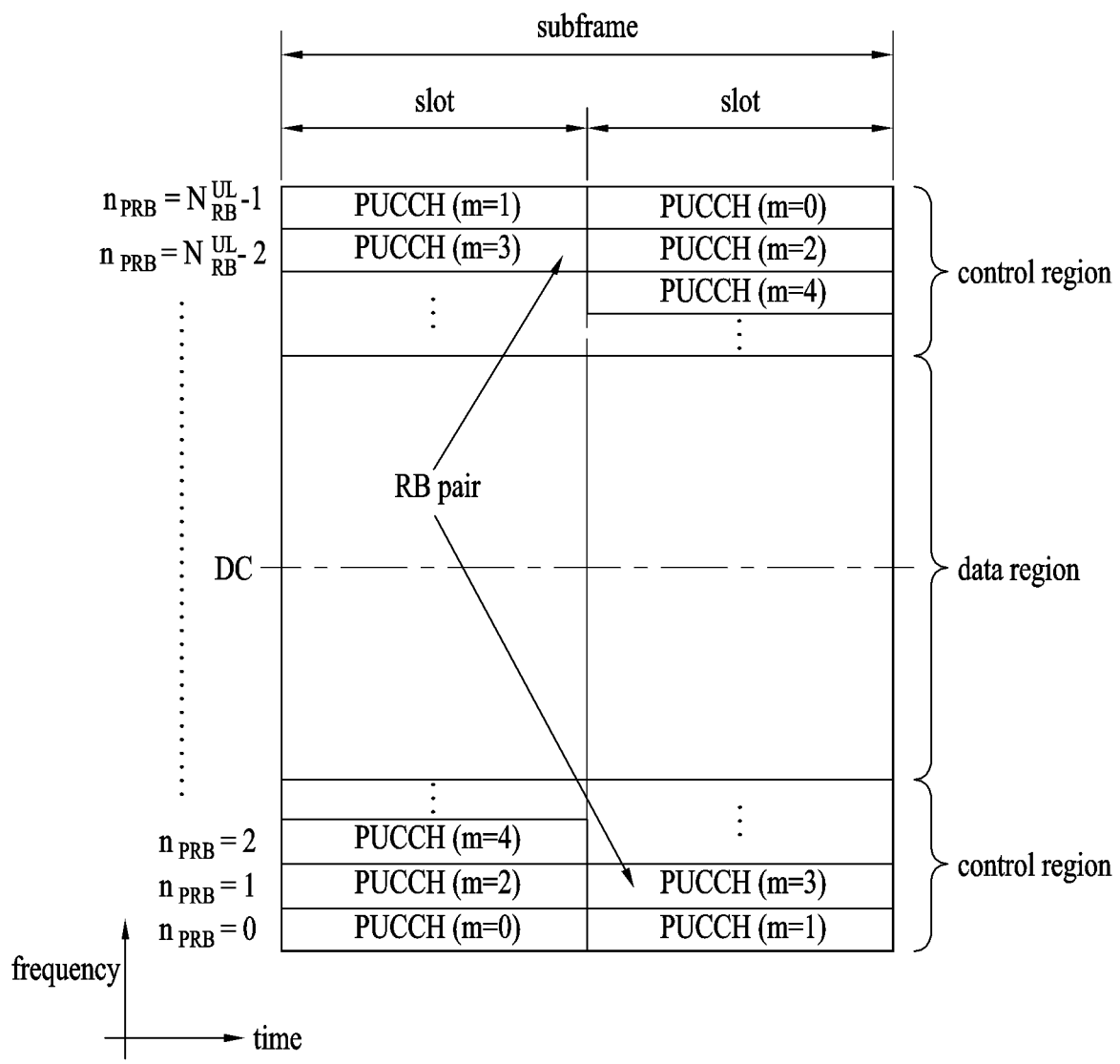
FIG. 4 exemplarily shows an uplink (UL) subframe for use in a 3GPP LTE/LTE-A system.
Figure 5:
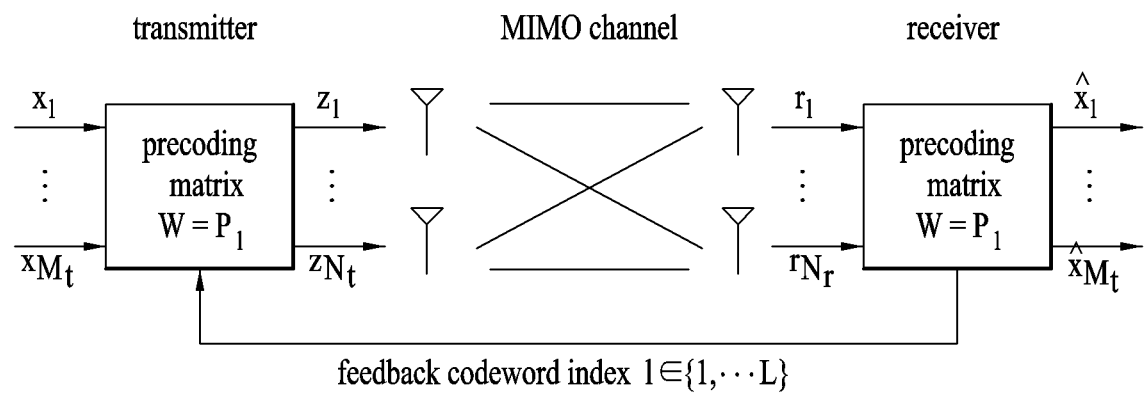
FIG. 5 is a conceptual diagram illustrating codebook based beamforming.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.
  HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.
  Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Codebook-Based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
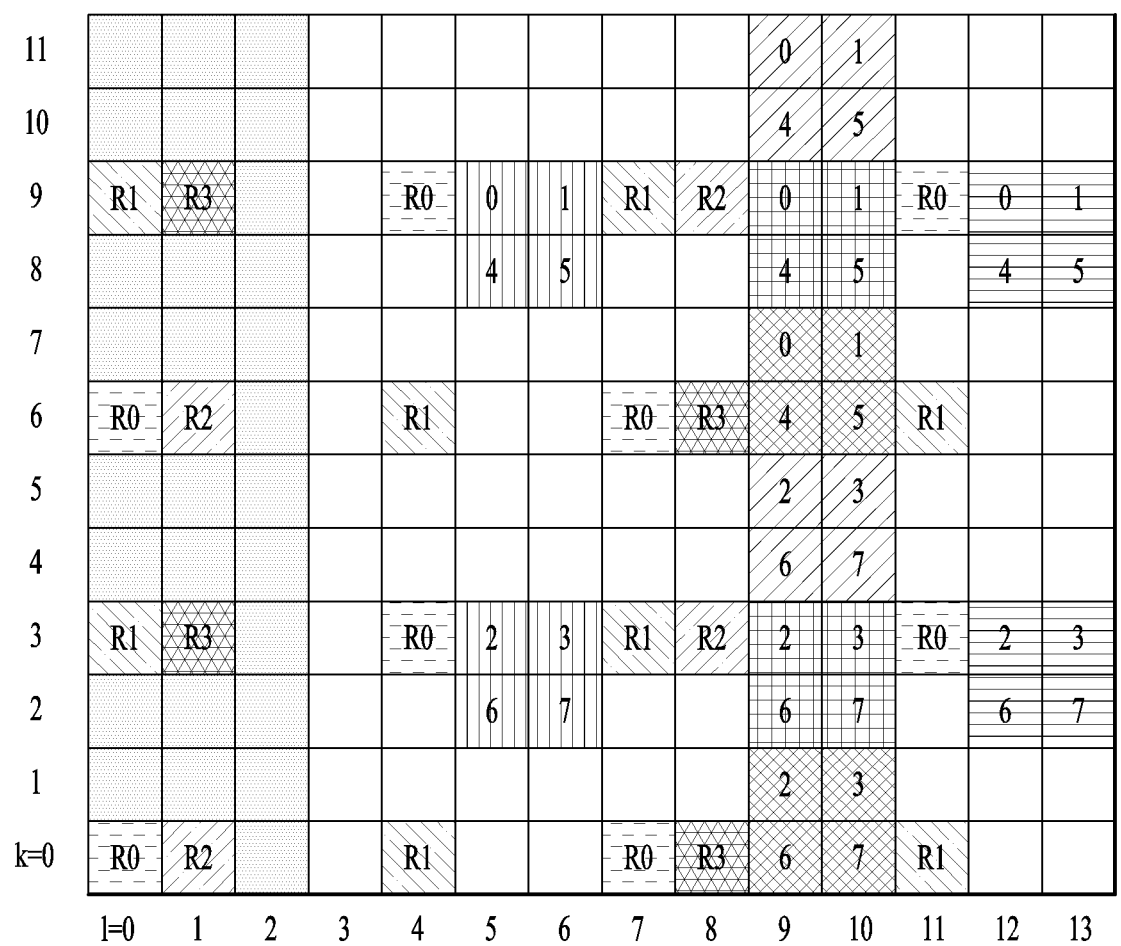
FIG. 6 is a conceptual diagram illustrating a transmittable pattern of CSI-RS having 8 antenna ports in a resource block (RB) composed of 12 subcarriers in the LTE-A system.

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook Index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set {s} configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left( \pm 1, \pm j, \pm \frac{(1+j)}{\sqrt{2}}, \pm \frac{(-1+j)}{\sqrt{2}} \right)$$

used for 8-PSK. In the example codebook of Table 6, since the alphabet of the respective elements of all precoding matrices in the codebook is configured by $$\left\{ \pm 1, \pm j, \pm \frac{(1+j)}{\sqrt{2}}, \pm \frac{(-1+j)}{\sqrt{2}} \right\},$$

the codebook may be considered as having the constrained alphabet property.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

As described above, two downlink RSs (i.e., a cell-specific RS (CRS) and a UE-specific RS) have been defined for a unicast service in the LTE system. UE-specific RS may be used only for data demodulation, and CRS may be used not only for data demodulation but also for RRM measurement (such as CSI acquisition or handover). CRS may be transmitted to the entire system band every subframe, and RS for a maximum of 4 antenna ports may be transmitted according to the number of transmit (Tx) antennas of a base station (BS). For example, assuming that the BS includes two Tx antennas, CRSs for antenna ports #0 and #1 may be transmitted. Assuming that the BS includes four Tx antennas, CRSs for antenna ports (#0~#3) may be respectively transmitted.

The LTE-A system may support a maximum of 8 Tx antennas through downlink of the BS. If the LTE-A system transmits a reference signal (RS) for a maximum of 8 Tx antennas to the entire band at each subframe according to the same scheme as in CRS of the legacy LTE, RS overhead may excessively increase. Therefore, RS for use in LTE-A may be classified into a CSI-RS for CSI measurement for selecting MCS, PMI, etc. and a DM-RS for data demodulation in such a manner that two RSs may be added. Although CSI-RS can be used for RRM measurement, the CSI-RS has been designed for CSI acquisition. CSI-RS is not used for data demodulation, such that the CSI-RS need not be transmitted at each subframe. Therefore, CSI-RS may be intermittently transmitted on a time axis so as to reduce CSI-RS overhead. For data demodulation, DM-RS may be dedicatedly transmitted to the UE scheduled in the corresponding time-frequency domain. That is, DM-RS of a specific UE may be transmitted only to the region (i.e., the time-frequency domain for receiving data) in which the corresponding UE is scheduled.

FIG. 6 is a conceptual diagram illustrating a transmittable pattern of CSI-RS having 8 antenna ports in a resource block (RB) composed of 12 subcarriers in the LTE-A system. RS for only one antenna port is spread throughout two OFDM symbols, and two RSs may share two REs and may be identified by the orthogonal codes. For example, RS denoted by numbers 0 and 1 may indicate two REs to which CSI-RS ports #0 and #1 are transmitted. For convenience of description and better understanding of the present invention, CSI-RS port #0 or #1 may be used. In order to discriminate between other RSs (e.g., CRS or UE-specific RS), CSI-RS port #0 or #1 may have an index #15 or #16. CSI-RS may include not only port #8 but also other ports (#1, #2, #4).

Figure 7:
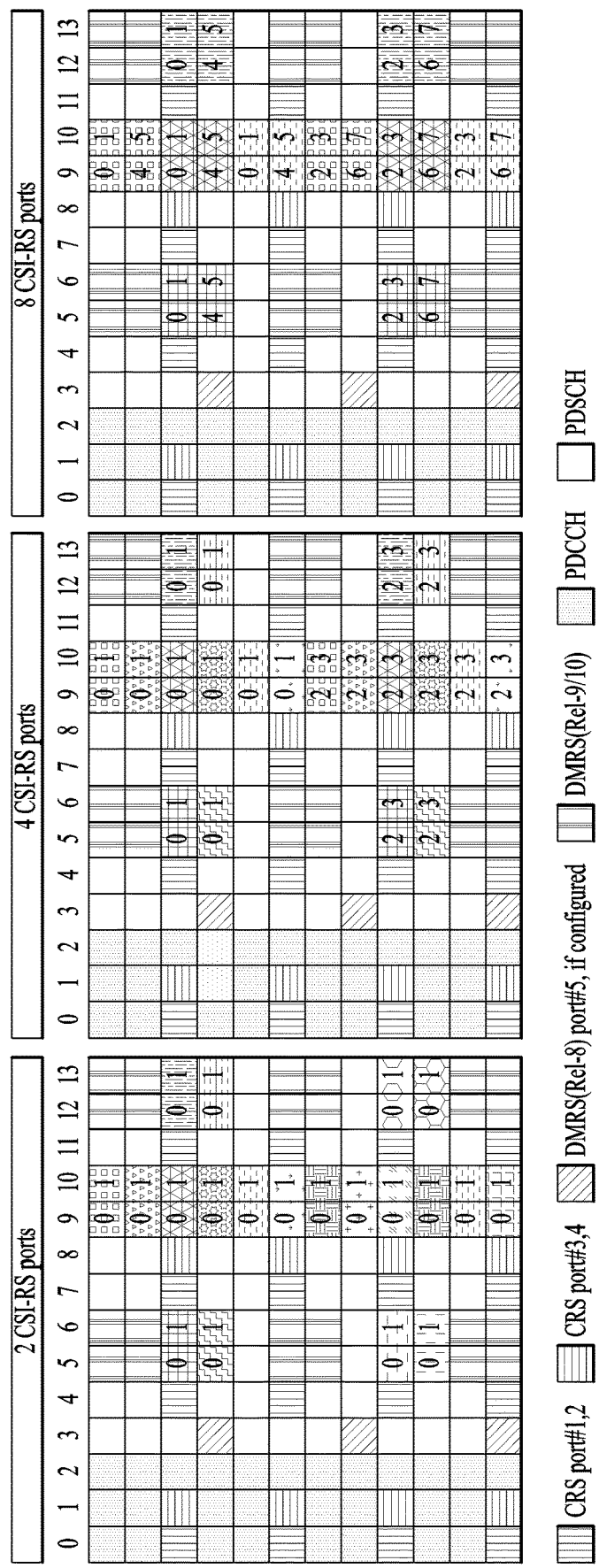
FIG. 7 is a conceptual diagram illustrating 2-port, 4-port, and 8-port CSI-RS transmission patterns.

In a method for transmitting a normal CP as shown in Table 7, the positions of Tx REs of the N-port CSI-RS may be denoted by a subcarrier index (k), an OFDM symbol index (l), and a slot index ($n_s$). As can be seen from Table 7, 8-port CSI-RS commonly applied to the frame structure type (FDD mode) and the Type 2 (TDD mode) of the LTE system may have only 5 Tx patterns in only one subframe. FIG. 7 shows 2-port, 4-port, and 8-port CSI-RS transmission patterns.

TABLE 7

| CSI-RS configuration | Number of CSI-RSs configured | | | | | |
|---|---|---|---|---|---|---|
| | 1 or 2 | | 4 | | 8 | |
| | (k', l') | $n_{smod2}$ | (k', l') | nsmod2 | (k', l') | nsmod2 |
| FS-1 and FS-2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

CSI-RS configuration for use in the current LTE standard is composed of antennaPortsCount, subframeConfig, resourceConfig, etc., such that the CSI-RS configuration may indicate how many antenna ports are used for CSI-RS transmission, may indicate the period and offset of the subframe to which CSI-RS will be transmitted, and may indicate which RE position (frequency and OFDM symbol index) within the corresponding subframe is used for CSI-RS transmission. In more detail, the BS may transmit the following information when transmitting specific CSI-RS configuration to the UE.

antennaPortsCount: This is a parameter (e.g., 1 CSI-RS port, 2 CSI-RS ports, 4 CSI-RS ports, or 8 CSI-RS ports) for indicating the number of antenna ports used for CSI-RS transmission.

resourceConfig: This is a parameter indicating the position of CSI-RS allocation resource. The parameter may be allocated to CSI-RS configuration of FIG. 7. At this time, the CSI-RS configuration may be referred to as CSI-RS pattern.

subframeConfig: This is a parameter indicating a subframe period and an offset to be used for CSI RS transmission.

p-C: This is a parameter for UE assumption for a reference PDSCH transmit (Tx) power for CSI feedback CSI-RS. Pc is the ratio of CSI-RS EPRE to PDSCH EPRE (energy per resource element) when a user equipment (UE) has [−8, 15] dB values as the 1 dB step during calculation of the CSI feedback.

zeroTxPowerResourceConfigList: This is a parameter for zero-power CSI-RS configuration.

zeroTxPowerSubframeConfig: This is a parameter for the subframe period and offset to be used for transmission of a zero power CSI-RS.

Massive MIMO

Introduction of the active antenna system (AAS) is considered in the evolved wireless communication systems. The AAS refers to a system in which each antenna includes an active element such as an amplifier, differently from a conventional passive antenna system in which the amplifier capable of adjusting the phase and magnitude of a signal is separated from the antenna. The AAS is efficient in terms of energy and operation cost since the AAS uses active antennas and thus does not require an additional cable, connector, hardware and the like to connect the amplifier to antennas. In addition, since the AAS supports electronic beam control for each antenna, the AAS enables enhanced MIMO technology such as formation of an accurate beam pattern in consideration of a beam direction and a beam width or formation of a three-dimensional (3D) beam pattern.

Figure 8:
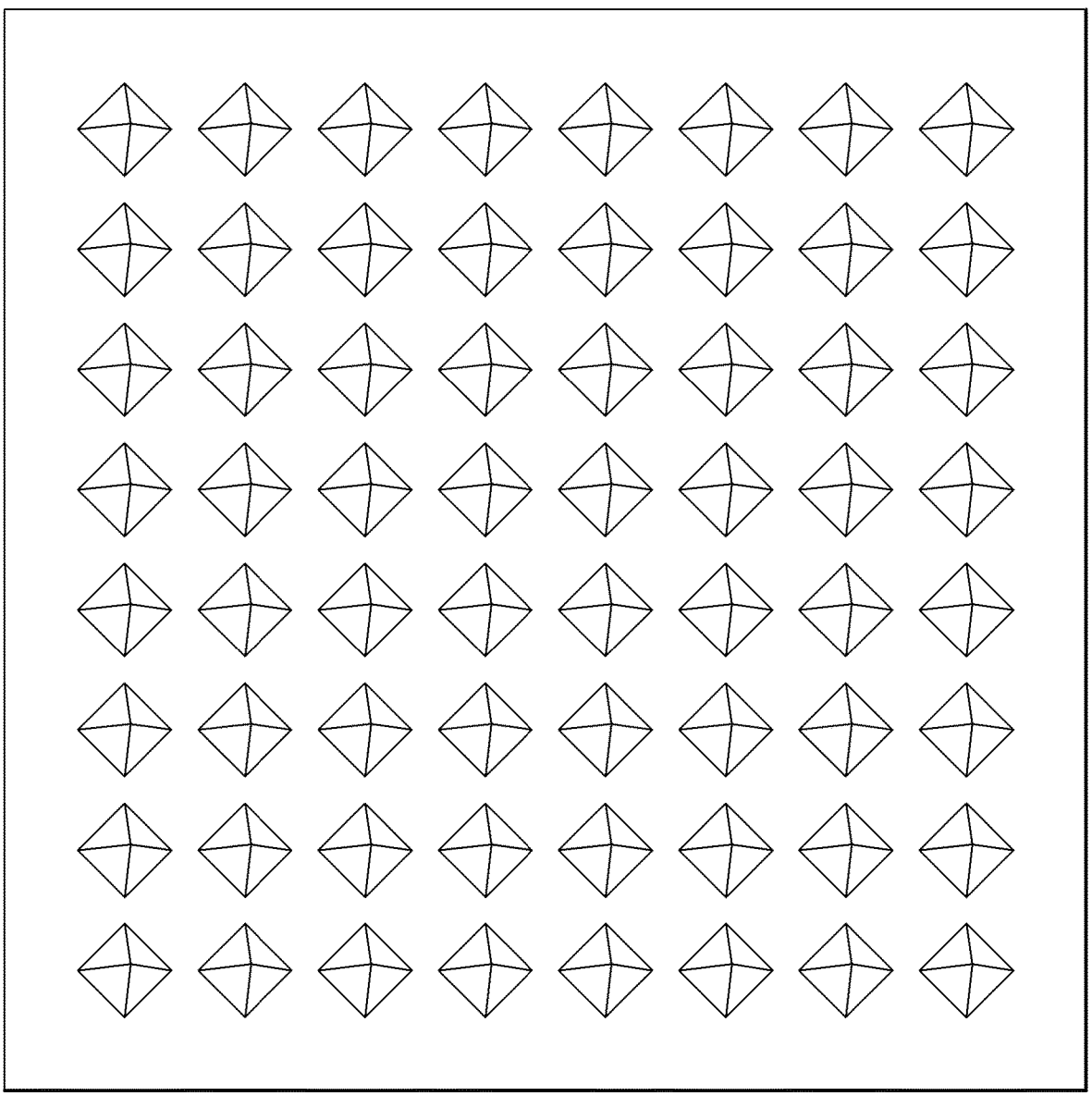
FIG. 8 is a conceptual diagram illustrating a two-dimensional (2D) antenna array.

With the introduction of an enhanced antenna system such as the AAS, a large-scale MIMO system having a plurality of input/output (I/O) antennas and a multi-dimensional antenna structure is considered. For example, when a two-dimensional (2D) antenna array instead of a conventional linear antenna array is formed, a three-dimensional (3D) beam pattern can be generated according to active antennas of the AAS. $N_t$ (i.e., $N_t=N_v \cdot N_h$) antennas may have a square shape as a general 2D antenna array as shown in FIG. 8. $N_h$ is the number of antenna columns, and $N_v$ is the number of antenna rows.

Figure 9:
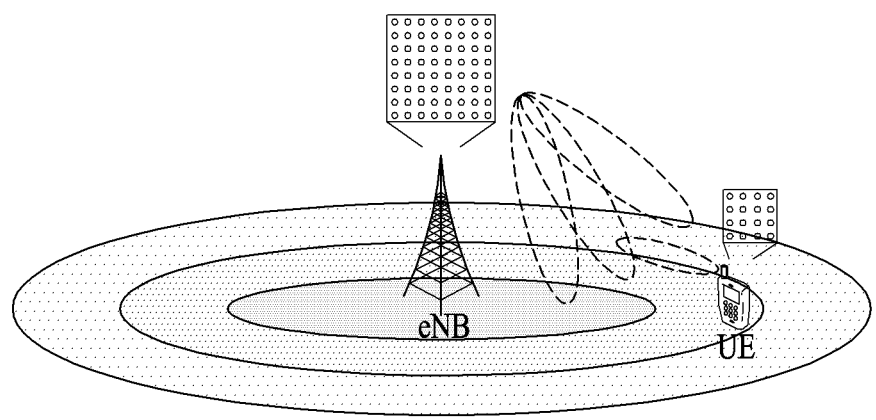
FIG. 9 is a conceptual diagram illustrating a 3D beam pattern based on the 2D antenna array.

When using the 3D beam pattern in terms of Tx antenna, semi-static or dynamic beam may be formed not only in the horizontal direction of the beam, but also in the vertical direction of the beam. For example, application of the vertical directional sector formation may be considered. In addition, when the receive (Rx) beam is formed using large-scale antennas in terms of the Rx antenna, signal power may increase according to the antenna array gain. On uplink, the BS may receive signals from the UE through the plurality of antennas. In this case, the UE may have a very low Tx power in consideration of large-scale Rx antennas so as to reduce influence of interference. FIG. 9 is a conceptual diagram of the above-mentioned example, and is a conceptual diagram illustrating the system including a plurality of Tx/Rx antennas through which the BS or UE can form the AAS-based 3D beam.

eICIC

Enhanced Inter-Cell Interference Coordination (eICIC) system is a technique that coverage of a small cell is enlarged to allow a UE at the cell edge to access the small cell, thereby acquiring gain of load balancing between a macro cell and the small cell in a heterogeneous network (HetNet). That is, the eICIC system is a technique to which a cell range expansion (CRE) technique of the small cell is applied. In this process, time domain eICIC is applied as a method for reducing dominant interference applied to a range expansion area from the macro cell. The time domain eICIC is a system in which the macro cell configures a time domain that less affects interference on the small cell, that is, subframe through an almost blank subframe (ABS) or ABS with MBSFN configuration, and the small cell schedules UEs within the range expansion area at the corresponding subframe. When the eICIC system is applied, there is a big difference in a level of interference applied to UE which receives PDSCH from the small cell, depending on the ABS of the macro cell. Therefore, the subframe is divided into two sets, that is, a time interval where interference is applied from the macro cell, and a time interval where interference is not applied from the macro cell, whereby CSI for each cell is reported.

eIMTA

In an eIMTA (enhanced interference management and traffic adaptation) system, UL-DL configuration is dynamically changed as one of a method for improving traffic adaptation of a TDD system. To actively support Dynamic UL-DL reconfiguration, each subframe is divided into a static subframe (SF) and a flexible SF depending on whether a duplex direction of the corresponding subframe may be changed. That is, the static SF means a subframe that a duplex direction of SF is maintained for a certain time (for example, change period of UL-DL configuration of SIB1), and the flexible SF means a subframe that a duplex direction may be changed depending on the need of the eNB. When the eIMTA system is applied, there is a big difference between the static SF and the flexible SF in a level of interference from a neighboring cell. Therefore, the subframe is divided into two sets, that is, the static SF and the flexible SF, whereby CSI for each CSI is reported.

Prior to description of the present invention, technical configuration based on the present invention will be described in detail. In the present invention, a feedback operation of channel information through independent CSI feedback configuration will be referred to as a CSI process. Therefore, the base station may configure one or more CSI processes for each UE, and the configuration information may be provided in the form of RRC signaling.

Conventionally, the base station has configured one or more CSI processes through RRC signaling, and one CSI-RS resource and one CSI-IM (Interference Measurement) resource have been configured per CSI process. Hereinafter, 'CSI-RS resource' and 'CSI-RS resource configuration' are used to have the same meaning.

The present invention suggests that the CSI process is enlarged to include one or more CSI-RS resources and/or one or more CSI-IM resources. At this time, the CSI-RS resource means a resource used when the UE measures CSI, and the CSI-IM resource means a resource used when the UE performs interference estimation during CSI measurement. Therefore, in the present invention, the base station may provide the UE with configuration information on a CSI process for which one or more CSI-RS resources and one or more CSI-IM resources are configured, wherein the configuration information may be provided in the form of RRC signaling. At this time, the CSI-IM resource may be configured in accordance with a transmission mode. For example, the CSI-IM resource may not be configured for the CSI process in case of transmission mode 9, and the CSI-IM resource may be configured for the CSI process in case of transmission mode 10.

In the present invention, the UE selects one of a plurality of beams (specifically, signals transmitted and received between antenna ports per group) and reports CSI (channel state information) of the corresponding beam. At this time, the present invention suggests a method for dividing a time interval for inter-cell interference control and independently restricting the beam that may be selected by the UE per time interval. Alternatively, the present invention suggests a method for independently restricting the beam that may be selected by the UE per time interval when CSI-RS resource independent per antenna port group is allocated and the UE reports CSI for the selected CSI-RS resource.

In the present invention, directions of transmission beams may be configured differently per antenna port group by using mapping between antenna ports and antenna elements different per antenna group. Representatively, a vertical angle of transmission beams may be configured differently per antenna port group. As a detailed example, antenna port group 1 may be configured to transmit a signal in a direction of a zenith angle of 100° and antenna port group 2 may be configured to transmit a signal in a direction of a zenith angle of 110°. In this case, in the suggested method of the present invention, a selection operation of the antenna port group may be referred to as a selection operation of a transmission beam direction. In other words, the selected antenna port group index has the same meaning as the selected beam index.

In other words, in the present invention, if a three-dimensional direction for transmitting or receiving signals per antenna port group is configured differently, an antenna port group index which is an indicator for a specific antenna port group may be understood as the same meaning as a beam index which is an indicator for a specific signal transmission direction. Also, if CSI-RS resources different per antenna port group are matched or allocated, CSI-RS resource index which is an indicator for a specific CSI-RS resource may be understood as the same meaning as the antenna port group index.

If a plurality of CSI-RS resources are configured for a CSI process by the base station and antenna ports of each CSI-RS resource are grouped into one group, that is, if CSI-RS resources independent per antenna port are allocated, the selected beam index described in the present invention has the same meaning as the selected CSI-RS resource index. That is, "antenna port group" may mean each CSI-RS resource unit included in a specific CSI process. Also, selection of a specific antenna port group may correspond to an operation for selecting a specific CSI-RS resource. In this way, the CSI process applicable to the present invention is associated with K CSI-RS resources, and a certain number of antenna ports may be associated with each CSI-RS resource. For example, the kth CSI-RS resource may be associated with Nk antenna ports (in this case, k=0, . . . , K−1). In this case, a value greater than or the same as 1 may be applied to K.

In the present invention, a CSI process that includes a plurality of beamformed (BF) CSI-RS resources will be referred to as a BF CSI process. At this time, the plurality of CSI-RS processes may be configured for the BF CSI process, or may be associated with the BF CSI process.

Also, in the present invention, an element that includes one or more of the plurality of CSI-RS resources configured for the BF CSI process will be referred to as a 'set'. At this time, one or more CSI-RS resources may be allocated to each 'set'. This 'set' may mean 'CSI subframe set' or 'CSI-RS resource set' as mentioned in the detailed description of the present invention.

A method for reporting a channel state as suggested in the present invention will be described in detail on the basis of the aforementioned description. The base station according to the present invention provides the UE with configuration information on a plurality of sets that include a plurality of CSI-RS resources or one or more CSI-RS resources configured for a specific CSI process. The UE reports CSI measured based on CSI-RS resource only included in one of the plurality of sets. At this time, the one set may include only some of the plurality of CSI-RS resources configured for the specific CSI process. That is, when measuring CSI, the UE may measure CSI on the basis of some of the plurality of CSI-RS resources configured for the specific CSI process.

Hereinafter, for convenience of description, the embodiments of the present invention will be described based on 'CSI-RS resource'. If CSI-RS configuration, that is, CSI-RS pattern is varied, since the CSI-RS configuration is also varied, the following embodiments may equally be applied to even the case that the CSI-RS resource is changed to the CSI-RS configuration.

In this respect, in the description of the present invention, although each embodiment will be described based on "CSI-RS configuration", the embodiments in which 'CSI-RS configuration' is expressed may be applied to the case that the 'CSI-RS configuration' is changed to 'CSI-RS resource' or 'CSI-RS resource configuration'.

As described above, the 'set' may be referred to as 'CSI subframe set' or 'CSI-RS resource set' in accordance with each suggested method, and the detailed description of the present invention is as follows.

[BF CSI Process Including CSI Subframe Set]

In the following first and second suggested methods, CSI subframe set may separately be designated and equally be applied to all CSI processes. In this case, the base station may notify the UE of CSI subframe set configuration information through RRC signaling separately from CSI process configuration. Additionally, the base station may notify the UE whether CSI subframe set previously designated per CSI process is applied to a corresponding CSI process. Alternatively, a CSI subframe set may independently be designated per CSI process.

Figure 10:
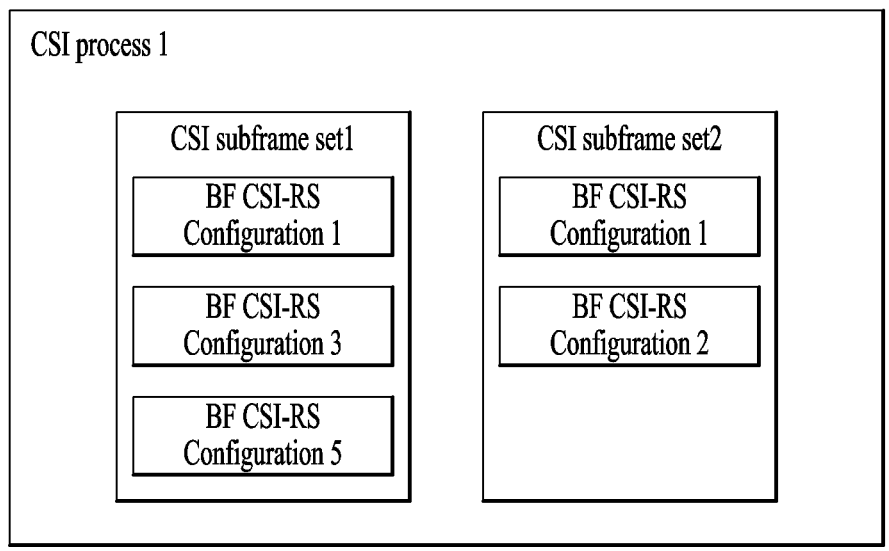
FIGS. 10 to 13 illustrate a CSI process according to the embodiment of the present invention.

Hereinafter, the technical configuration of the present invention will be described in detail with reference to FIGS. 10 to 12.

In the first suggested method, a method for individually designating BF CSI-RS configurations allocated per CSI subframe set if a subframe of a BF CSI process is divided into a plurality of CSI regions will be suggested. Therefore, as shown in FIG. 10, BF CSI-RS configurations may be allocated differently per CSI-subframe set included in CSI process 1. For example, in FIG. 10, BF CSI-RS configurations 1, 3 and 5 are allocated to CSI subframe set 1, and BF CSI-RS configurations 1 and 2 are allocated to CSI subframe set 2.

If general BF CSI process in which CSI subframe set is not divided is configured to include maximum N BF CSI-RS configurations, the number of CSI-RS configurations allocated per CSI subframe set may be configured so as not to exceed N even in the suggested method. That is, each BF CSI subframe set may be configured to include maximum N CSI-RS configurations.

At this time, the UE may be configured to report CSI only for one CSI subframe set. In this case, the UE may not have CSI report capability for one or more substrate sets at the same time. Unlike this case, if the UE is configured to report CSI for a plurality of subframe sets at the same time, a total sum of BF CSI-RS configurations which belong to subframe sets reported at the same time by the UE may be configured so as not to exceed N.

Figure 11:
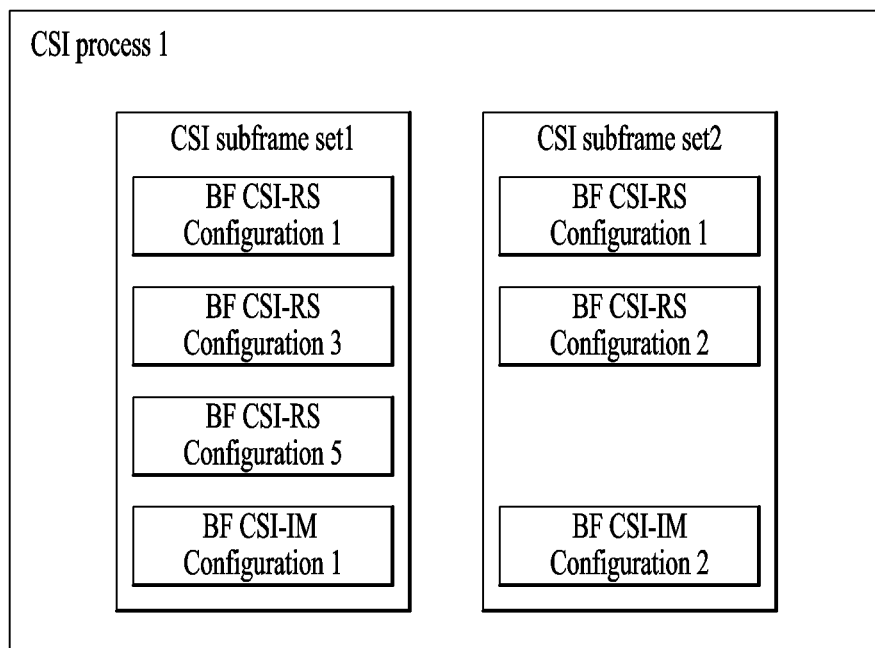

CSI-IM (Interference Measurement) resources or CSI-IM configuration for interference measurement may be allocated independently per CSI subframe set as shown in FIG. 11. Alternatively, one or more CSI-IM resources may be shared by one or more CSI subframe sets. At this time, interference measurement for CSI measurement of a specific BF CSI subframe set may be implemented in such a manner that interference may be measured by the CSI-IM resource on a subframe which belongs to the specific BF CSI subframe. Alternatively, if the CSI-IM resource is not included in the BF CSI process, interference from neighboring cells may be measured by resource elements to which CRS is transmitted. At this time, if the CSI subframe set within the specific BF CSI process is divided, such interference measurement may be performed at only the subframe included in the corresponding subframe set. As a result, CSI may be determined.

In the suggested method, if the UE is triggered to report aperiodic CSI at the nth subframe through PUSCH, the UE may designate the (n–x)th subframe as a CSI reference resource and measure and report CSI on the basis of the CSI subframe set corresponding to the subframe set to which the corresponding subframe belongs. Alternatively, when the UE is triggered to report aperiodic CSI at the nth subframe through PUSCH, the UE may be designated a corresponding CSI subframe of a corresponding CSI process to report CSI. At this time, the recent subframe which belongs to the corresponding CSI subframe set among previous subframes including the (n–x)th subframe may be defined as the CSI reference resource, whereby CSI may be measured and reported. At this time, values corresponding to integers may be used as n and x.

In the embodiment applicable to the present invention, CSI information reported by each UE may include a BI (Beam Indicator) or CRI (CSI-RS Resource Indicator) indicating BF CSI-RS resource or BF CSI-RS configuration indicated by the CSI. In FIG. 10 or FIG. 11, if the UE reports CSI for BF CSI-RS configuration 5 of CSI subframe set 1, the UE may report, to the base station, CSI for the BF CSI-RS configuration 5 together with BI or CRI indicating the BF CSI-RS configuration 5.

In the second suggested method, a method for individually designating restriction for selection of BF CSI-RS configurations per CSI subframe set if a subframe is divided in a plurality of CSI regions in a BF CSI process will be suggested. In the second suggested method, if a plurality of BF CSI-RS configurations are allocated to CSI process 1 as shown in FIG. 12, restriction for BF CSI-RS configuration that may be selected per CSI subframe set may be given.

Figure 12:
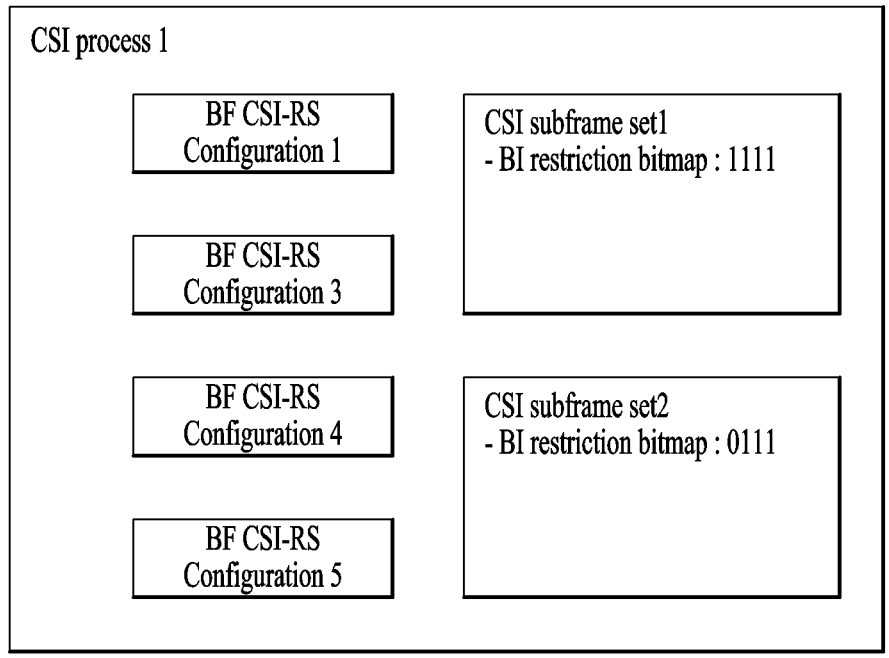

For example, as shown in FIG. 12, if BF CSI-RS configurations 1, 3, 4 and 5 are allocated for the CSI process 1, the base station may provide, to the UE, restriction information '1111' of bitmap format as beam index subset restriction information for CSI subframe set 1. At this time, if the UE measures CSI on the basis of the CSI subframe set 1, the UE may select and report CSI measured from the BF CSI-RS configurations 1, 3, 4 and 5. Also, the base station may provide, to the UE, '0111' as beam index subset restriction information for CSI subframe set 2. At this time, if the UE measures CSI on the basis of the CSI subframe set 2, the UE may select and report CSI measured from the BF CSI-RS configurations 3, 4 and 5.

The suggested method may be used such that the UE may previously be prevented from reporting CSI for beam 1 selected in order that the base station may only use beams 3, 4 and 5 or CSI-RS configurations 3, 4 and 5 for the purpose of eICIC or eIMTA for a time interval corresponding to CSI subframe set 2. That is, in the suggested method, CSI report based on beams of all directions is available for the time interval corresponding to the CSI subframe set 1 but CSI report for restricting a beam (representatively, beam transmitted in a direction of a zenith angle of 90°) of a specific direction to attenuate interference applied from a neighboring cell for the time interval corresponding to CSI subframe set 2 may be provided.

In the second suggestion method, BF CSI-RS resources or BF CSI-RS configurations allocated to BF CSI process may be configured to be selected for CSI report from at least one or more subframe sets. That is, specific CSI-RS configuration may be configured to be allocated to at least one of all CSI subframe sets.

In the suggestion method which is modified, the base station may provide beam index subset restriction information for a specific CSI subframe set (set 2 or set 1) only. That is, the base station may not provide beam index subset restriction information for a specific CSI subframe set (set 1 or set 2). Therefore, when the UE reports CSI on the basis of the specific CSI subframe set, for CSI report, the UE may select all BF CSI-RS configurations (or candidate beams) configured for the BF CSI process.

On the other hand, the base station may provide beam index subset restriction information for the other CSI subframe set (set 2 or set 1), whereby the UE may select enabled BF CSI-RS configurations (or candidate beams) only for CSI report. Therefore, signal transmission in a direction of some beams may be restricted at the corresponding CSI subframe set.

If a general BF CSI process in which CSI subframe set is not divided is configured to include maximum N BF CSI-RS configurations, the number of CSI-RS configurations may be configured so as not to exceed N even in the BF CSI process in which the CSI subframe set is divided. In a modified method, CSI-RS configurations may be configured or allocated to exceed N in the BF CSI process that includes the CSI subframe set, and beam index subset restriction may be applied to each CSI subframe set, whereby maximum N enabled BF CSI-RS configurations may be configured per CSI subframe set.

Also, even in the second suggested method in the same manner as the first suggested method, if the UE is triggered to report aperiodic CSI at the nth subframe through PUSCH, the UE may designate the (n–x)th subframe as a CSI reference resource and measure and report CSI on the basis of the CSI subframe set corresponding to the subframe set to which the corresponding subframe belongs. Alternatively, when the UE is triggered to report aperiodic CSI at the nth subframe through PUSCH, the UE may be designated a corresponding CSI subframe of a corresponding CSI process to report CSI. At this time, the recent subframe which belongs to the corresponding CSI subframe set among previous subframes including the (n–x)th subframe may be defined as the CSI reference resource, whereby CSI may be measured and reported. At this time, values corresponding to integers may be used as n and x.

Also, even in the second suggested method in the same manner as the first suggested method, CSI-IM (Interference Measurement) resources for interference measurement may be allocated independently per CSI subframe set. Alternatively, one or more CSI-IM resources may be shared by one or more CSI subframe sets. At this time, interference measurement for CSI measurement of a specific BF CSI subframe set may be implemented in such a manner that interference may be measured by the CSI-IM resource on a subframe which belongs to the specific BF CSI subframe. Alternatively, if the CSI-IM resource is not included in the BF CSI process, interference from neighboring cells may be measured by resource elements to which CRS is transmitted. At this time, if the CSI subframe set within the specific BF CSI process is divided, such interference measurement may be performed at only the subframe included in the corresponding subframe set. As a result, CSI may be determined.

[BF CSI Process Including CSI-RS Resource Set]

In the third suggested method, a method for grouping BF CSI-RS configurations included in BF CSI process into a plurality of sets and allocating one CSI-IM resource to each resource set will be suggested. At this time, each BF CSI-RS configuration may be included in the plurality of sets, and may be configured to be necessarily included in at least one set.

Figure 13:
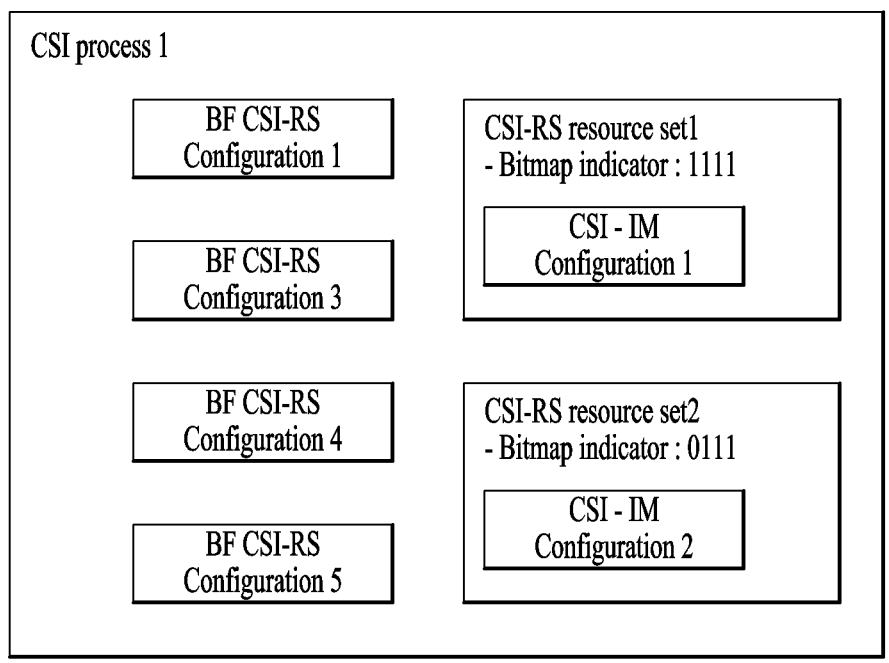

Unlike the first and second suggested methods, CSI subframe set is not applied to the third suggested method. This is because that the CSI-RS resource set may perform the role of the CSI subframe set instead of the CSI subframe set. If a plurality of BF CSI-RS resources or BF CSI-RS configurations are configured or allocated for CSI process 1 as shown in FIG. 13, the base station may indicate BF CSI-RS configuration and CSI-IM configuration allocated or included per CSI-RS resource set. For example, in FIG. 13, in a state that BF CSI-RS configurations 1, 3, 4 and 5 are allocated for CSI process 1, '1111' may be notified for CSI-RS resource set 1 as a bitmap indicator, thereby indicating that BF CSI-RS configurations 1, 3, 4 and 5 are included in the corresponding set. As a result, the UE may select and report CSI measured from the CSI-RS configurations. Also, '0111' may be notified for CSI-RS resource set 2 as a bitmap indicator, whereby the UE may select and report CSI measured from the BF CSI-RS configurations 3, 4 and 5.

In the suggested method, the UE may be designated dynamically or semi-statically from the base station as to a corresponding resource set corresponding to CSI which should be reported. For example, if the UE is triggered to report aperiodic CSI at the nth SF through PUSCH, the UE may be designated a corresponding CSI-RS resource set of a corresponding CSI process to report CSI including BI (Beam Indicator) or CRI (CSI-RS Resource Indicator). Alternatively, even in the case that the UE is designated semi-statically through PUCCH to report periodic CSI, the UE may be designated a corresponding CSI-RS resource set of a corresponding CSI process to report CSI including BI or CRI.

Codebook Subset Restriction

In additional embodiment of the present invention, codebook subset restriction for BF CSI-RS resources or BF CSI-RS configurations included in a specific BF CSI process may be configured.

As described above, the UE designated a specific BF CSI process and configured to report CSI through separate signal information may specify a channel environment experienced by a transmitting signal of a corresponding beam by receiving NZP (Non-Zero Power) CSI-RS transmitted through BF CSI-RS configuration and select and report a good beam. The UE may report a corresponding precoding of a corresponding rank, which is applied to antenna ports of the selected NZP CSI-RS, and may report CQI information, which may be obtained at this time, together with the information on the corresponding precoding. At this time, the UE may select a precoding matrix of matrixes within a codebook. The base station may provide the UE with codebook subset restriction information, whereby the UE may be configured so as not to select some of the matrixes within the codebook. In other words, the base station may restrict precoding matrixes, which may be selected for CSI report by the UE, to specific matrixes.

As a first method, codebook subset restriction may equally be designated for BF CSI-RS configurations included in the BF CSI process. This method has an advantage in that codebook subset restriction information may be delivered to the UE by less signaling overhead. This method is suitable when all BF CSI-RS configurations have the same sized antenna ports in a general 2D AAS environment. In the same manner as the first and second suggested methods, if CSI subframe set is applied, codebook subset restriction may be designated independently per subframe set.

As a second method, codebook subset restrictions may be designated independently for BF CSI-RS configurations included in the BF CSI process. This method has flexibility in that codebook subset restrictions may be designated differently per BF CSI-RS configuration if positions of antennas for transmitting BF CSI-RSs are different like the distributed antenna system, or if the number of antenna ports is different per CSI-RS configuration. In the same manner as the first and second suggested methods, if the CSI subframe set is applied, codebook subset restrictions may be designated independently per BF CSI-RS configuration and per subframe set.

As a third method, a plurality of codebook subset restriction information may be notified together with separate identification information (for example, ID), and identification information (for example, ID) to which codebook subset restrictions will be applied may be notified per CSI-RS configuration of a CSI process. In this method, codebook subset restrictions may be restricted to have maximum M. That is, BF CSI-RS configurations of the CSI process may have maximum N, and codebook subset restrictions may be restricted to have maximum M(<N).

Figure 14:
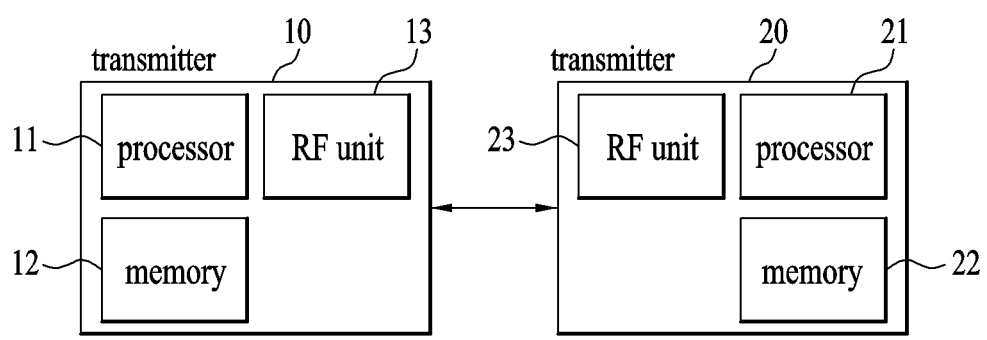
FIG. 14 is a block diagram illustrating an apparatus for implementing embodiment(s) of the present invention.

FIG. 14 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by combination of one or more embodiments of the present invention among the embodiments described above. For example, the transmitter may correspond to the UE of the present invention, and the receiver may correspond to the base station.

In more detail, the processor of the transmitter may be configured to receive configuration information on a plurality of sets, each of which includes one or more of a plurality of CSI-RS resources configured for a CSI process, from the receiver by controlling the RF unit of the transmitter and report CSI measured based on one or more CSI-RS configurations only included in a first set which is one of the plurality of sets. At this time, the first set may include some of the plurality of CSI-RS configurations configured for the CSI process.

Also, the processor of the receiver may be configured to transmit configuration information on a plurality of sets, each of which includes one or more of a plurality of CSI-RS resources configured for a CSI process, to the receiver by controlling the RF unit of the receiver and report CSI measured based on one or more CSI-RS configurations only included in a first set which is one of the plurality of sets. At this time, the first set may include some of the plurality of CSI-RS configurations configured for the CSI process. Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a UE, a relay, and a BS.

The invention claimed is:

1. A method of reporting channel state information (CSI) by a user equipment (UE) in a wireless communication system, the method comprising:
    based on (i) a plurality of CSI processes being configured to the UE and (ii) a plurality of channel state information reference signal (CSI-RS) configurations being allocated to each CSI process, receiving, by the UE, (i) first information on a certain CSI process among the plurality of CSI processes and (ii) second information on a part of the plurality of CSI-RS configurations allocated to the certain CSI process on the basis of a bitmap configuration;
    based on determination that the UE receives third information on a channel state information interference measurement (CSI-IM) configuration related to the second information,
    estimating the CSI based on (i) only CSI-RS resources related to the part of the plurality of CSI-RS configurations and (ii) first interference information estimated from a CSI-IM resource related to the CSI-IM configuration;
    based on determination that the UE does not receive the third information on the CSI-IM configuration related to the second information, estimating the CSI based on (i) the only CSI-RS resources related to the part of the plurality of CSI-RS configurations and (ii) second interference information estimated from a cell specific reference signal (CRS) resource that the CRS is received; and
    reporting, by the UE, the estimated CSI.

2. The method of claim 1, wherein a triggering signal for triggering a CSI report comprises either (i) the first information and the second information without the third information, or (ii) the first information, the second information and the third information.

3. The method of claim 1, wherein bitmap configuration is used to indicating whether each of the plurality of CSI-RS configurations allocated to the certain CSI process is included in the part of the plurality of CSI-RS configurations.

4. The method of claim 3, wherein the bitmap configuration has a bit length corresponding to a number of the plurality of CSI-RS configurations allocated to the certain CSI process.

5. The method of claim 1, wherein codebook information available for CSI measurement per the part of the plurality of CSI-RS configurations is configured individually by a base station.

6. The method of claim 5, wherein the codebook information available for CSI measurement per the part of the plurality of CSI-RS configurations is designated equally by the base station.

7. The method of claim 5, wherein the codebook information available for CSI measurement per the part of the plurality of CSI-RS configurations is designated independently by the base station.

8. The method of claim 5, further comprising:
receiving a plurality of codebook restriction information; and
receiving information indicating which one of the plurality of codebook restriction information is applied per the part of the plurality of CSI-RS configurations.

9. A method of receiving a channel state information (CSI) by a base station in a wireless communication system, the method comprising:
configuring a plurality of CSI processes to a user equipment (UE), each of the plurality of CSI processes including a plurality of channel state information-reference signal (CSI-RS) configurations;
transmitting, by the base station to the UE, (i) first information on a certain CSI process among the plurality of CSI processes and (ii) second information on a part of the plurality of CSI-RS configurations included in the certain CSI process on the basis of a bitmap configuration; and
receiving, by the base station from the UE, measured CSI,
wherein the measured CSI is estimated based on (i) only CSI-RS resources related to the part of the plurality of CSI-RS configurations and (ii) first interference information estimated from a channel state information-interference measurement (CSI-IM) resource related to a CSI-IM configuration, in a case where the base station transmits third information on the CSI-IM configuration related to the second information to the UE, and
wherein the measured CSI is estimated based on (i) the only CSI-RS resources related to the part of the plurality of CSI-RS configurations and (ii) second interference information estimated from a cell specific reference signal (CRS) resource that the CRS is received, in a case where the base station does not transmit the third information on the CSI-IM configuration related to the second information to the UE.

10. A user equipment (UE) in a wireless communication system, the UE comprising:
a radio frequency (RF) transceiver; and
a processor configured to control the RF transceiver,
wherein the processor is configured to:
based on (i) a plurality of channel state information (CSI) processes being configured to the UE and (ii) a plurality of channel state information-reference signal (CSI-RS) configurations being allocated to each CSI process, control the RF transceiver to receive (i) first information on a certain CSI process among the plurality of CSI processes and (ii) second information on a part of the plurality of CSI-RS configurations allocated to the certain CSI process on the basis of a bitmap configuration;
based on determination that the UE receives third information on a channel state information-interference measurement (CSI-IM) configuration related to the second information, estimate the CSI based on (i) only CSI-RS resources related to the part of the plurality of CSI-RS configurations and (ii) first interference information estimated from a CSI-IM resource related to the CSI-IM configuration;
based on determination that the UE does not receive the third information on the CSI-IM configuration related to the second information, estimate the CSI based on (i) the only CSI-RS resources related to the part of the plurality of CSI-RS configurations only and (ii) second interference information estimated from a cell specific reference signal (CRS) resource that the CRS is received; and
control the RF transceiver to report the estimated CSI.

11. A base station in a wireless communication system, the base station comprising:
a radio frequency (RF) transceiver; and
a processor configured to control the RF transceiver,
wherein the processor is configured to:
control the RF transceiver to configure, to a user equipment (UE), a plurality of channel state information (CSI) processes to a user equipment (UE), each of the plurality of CSI processes including a plurality of channel state information-reference signal (CSI-RS) configurations;
control the RF transceiver to transmit, to the UE, (i) first information on a certain CSI process among the plurality of CSI processes and (ii) second information on a part of the plurality of CSI-RS configurations included in the certain CSI process on the basis of a bitmap configuration; and
control the RF transceiver to receive, from the UE, measured CSI,
wherein the measured CSI is estimated based on (i) only CSI-RS resources related to the part of the plurality of CSI-RS configurations and (ii) first interference information estimated from a channel state information-interference measurement (CSI-IM) resource related to a CSI-IM configuration, in a case where the base station transmits third information on the CSI-IM configuration related to the second information to the UE, and
wherein the measured CSI is estimated based on (i) the only CSI-RS resources related to the part of the plurality of CSI-RS configurations only and (ii) second interference information estimated from a cell specific reference signal (CRS) resource that the CRS is received, in a case where the base station does not transmit the third information on the CSI-IM configuration related to the second information to the UE.

* * * * *